(12) United States Patent
Gueron et al.

(10) Patent No.: US 8,913,740 B2
(45) Date of Patent: *Dec. 16, 2014

(54) METHOD AND APPARATUS FOR GENERATING AN ADVANCED ENCRYPTION STANDARD (AES) KEY SCHEDULE

(71) Applicant: Intel Corporation, Santa Clara, CA (US)

(72) Inventors: Shay Gueron, Haifa (IL); Martin Dixon, Portland, OR (US); Srinivas Chennupaty, Portland, OR (US); Mayank Bomb, Hillsboro, OR (US); Brent Boswell, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,224

(22) Filed: Mar. 8, 2013

(65) Prior Publication Data

US 2013/0188789 A1    Jul. 25, 2013

Related U.S. Application Data

(63) Continuation of application No. 11/841,556, filed on Aug. 20, 2007, now Pat. No. 8,787,565.

(51) Int. Cl.
*H04K 1/00* (2006.01)
*H04L 9/00* (2006.01)
*H04L 9/28* (2006.01)
*H04L 9/06* (2006.01)

(52) U.S. Cl.
CPC ............... *H04L 9/28* (2013.01); *H04L 9/0631* (2013.01); *H04L 2209/125* (2013.01); *H04L 2209/24* (2013.01)
USPC .............................................. 380/28; 726/34

(58) Field of Classification Search
USPC .......................................................... 380/29
See application file for complete search history.

(56) References Cited

U.S. PATENT DOCUMENTS

| 7,155,601 | B2 * | 12/2006 | Chennupaty et al. ......... 712/300 |
| 7,570,760 | B1 | 8/2009 | Olson et al. |

(Continued)

FOREIGN PATENT DOCUMENTS

| KR | 10-2002-0061718 A | 7/2002 |
| WO | 03/019357 A1 | 3/2003 |

(Continued)

OTHER PUBLICATIONS

Fumihiko Sano; Performance Evaluation of AES Finalists on the High-End Smart Card; Year:2000; Toshiba Research and Development Center; pp. 1-22.*

International Search Report and Written Opinion received for PCT Application No. PCT/US2008/058128, Mailed Jul. 31, 2008, 10 pages.

(Continued)

*Primary Examiner* — David Garcia Cervetti
*Assistant Examiner* — Monjour Rahim
(74) *Attorney, Agent, or Firm* — Trop, Pruner & Hu, P.C.

(57) ABSTRACT

An Advanced Encryption Standard (AES) key generation assist instruction is provided. The AES key generation assist instruction assists in generating round keys used to perform AES encryption and decryption operations. The AES key generation instruction operates independent of the size of the cipher key and performs key generation operations in parallel on four 32-bit words thereby increasing the speed at which the round keys are generated. This instruction is easy to use in software. Hardware implementation of this instruction removes potential threats of software (cache access based) side channel attacks on this part of the AES algorithm.

20 Claims, 10 Drawing Sheets

(56) References Cited

U.S. PATENT DOCUMENTS

| | | |
|---|---|---|
| 7,702,100 B2 | 4/2010 | Han |
| 7,702,110 B2 * | 4/2010 | McCue .......... 380/278 |
| 8,155,308 B1 | 4/2012 | Poo et al. |
| 2003/0053623 A1 * | 3/2003 | McCanny et al. ........... 380/37 |
| 2003/0108195 A1 * | 6/2003 | Okada et al. ............. 380/37 |
| 2004/0208072 A1 * | 10/2004 | Henry et al. .............. 365/203 |
| 2005/0213756 A1 * | 9/2005 | Hubert .............. 380/44 |
| 2005/0271204 A1 | 12/2005 | Chu |
| 2008/0019504 A1 * | 1/2008 | Han et al. ............. 380/28 |
| 2008/0159526 A1 | 7/2008 | Gueron et al. |
| 2008/0240426 A1 | 10/2008 | Gueron et al. |

FOREIGN PATENT DOCUMENTS

| | | |
|---|---|---|
| WO | 2008/083365 A1 | 7/2008 |
| WO | 2008/121614 A1 | 10/2008 |

OTHER PUBLICATIONS

International Preliminary Report on Patentability and Written Opinion received for PCT Application No. PCT/US2008/058128, mailed Oct. 8, 2009, 6 pages.

International Search Report and Written Opinion received for PCT Application No. PCT/US2007/089175, mailed Jun. 5, 2008, 11 pages.

International Preliminary Report on Patentability and Written Opinion received for PCT Application No. PCT/US2007/089175, mailed Jul. 9, 2009, 6 pages.

Hunt, "Secure Processors: For Secure Devices and Secure End-to-End Infrastructure", IBM Corporation, 2006, 14 pages; http://www.research.ibm.com/jam/secure-processors5-30-06.pdf, downloaded from Internet on Aug. 4, 2008.

"Advanced Encryption Standard (AES)", Federal Information Processing Standards Publication 197, Nov. 26, 2001, pp. i-iv and 1-47.

* cited by examiner

METHOD AND APPARATUS FOR GENERATING AN ADVANCED ENCRYPTION STANDARD (AES) KEY SCHEDULE

This application is a continuation of U.S. patent application Ser. No. 11/841,556, filed Aug. 20, 2007, the content of which is hereby incorporated by reference.

TECHNICAL FIELD

This disclosure relates to cryptographic algorithms and in particular to the Advanced Encryption Standard (AES) algorithm.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transform intelligible data referred to as "plaintext" into an unintelligible form referred to as "cipher text". The transformations in the cipher include: (1) Adding a round key (value derived from the cipher key) to the state (a two dimensional array of bytes) using a Exclusive OR (XOR) operation; (2) Processing the state using a non-linear byte substitution table (S-Box) (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. AES operations with the different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm is a compute intensive algorithm that is typically performed in software or in a special purpose processor. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

AES is a block cipher that operates on a 128-bit block of bits with a key size of 128, 192 or 256 bits. A sequence of operations is iterated for a number of rounds (10, 12 or 14) based on the key size.

The generation of the 128-bit round keys from the 128, 192 or 256-bit cipher key that are used for each round (that is, the key schedule) may be performed on the fly (that is, just prior to each round) using implicit 128-bit registers to store the round key for that round. However, the use of implicit registers may reduce the performance of x86 register-based processors due to dependency on a result of a previous instruction.

There are some applications, for example, an application that processes network packets that may have different keys per flow that benefit from on-the-fly key generation. There may be other applications where greater performance is required with the single key, for example, a single key that is used for encrypting/decrypting contents of a storage device such as a disk drive. Thus, there arises a need for flexibility of key generation. An embodiment of the invention provides a flexible architecture and instruction for generating an AES key schedule in a general purpose processor.

Figure 1:
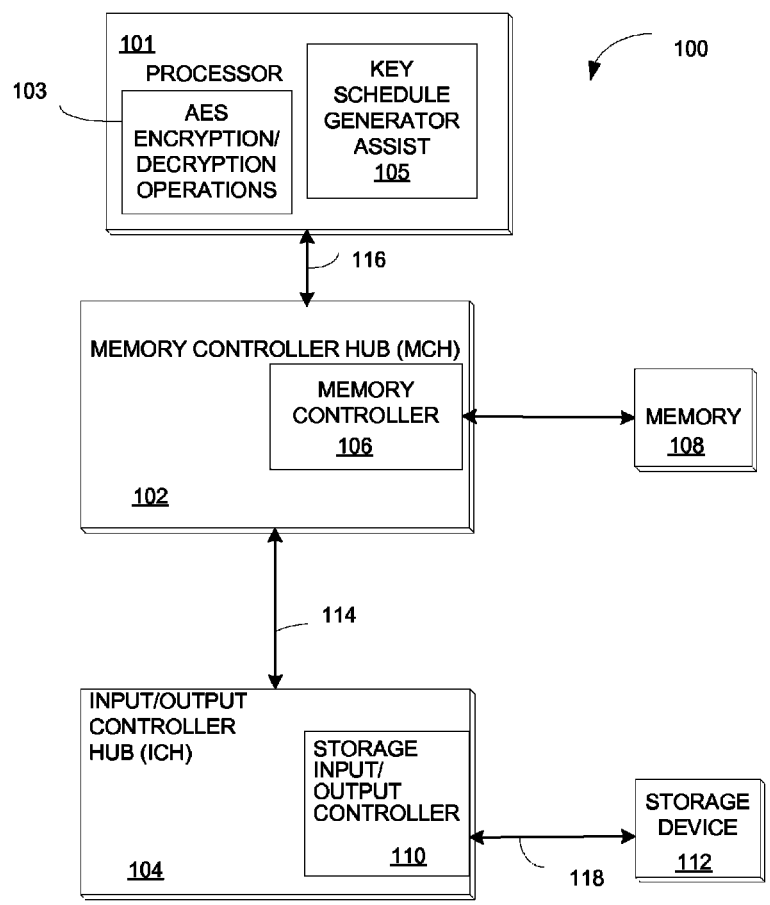
FIG. 1 is a block diagram of a system that includes an embodiment of an AES key schedule generator assist in a general purpose processor according to the principles of the present invention.

FIG. 1 is a block diagram of a system 100 that includes an embodiment of an AES key schedule generator assist 105 in a general purpose processor according to the principles of the present invention. The system 100 includes a processor 101, a Memory Controller Hub (MCH) or (Graphics Memory Controller Hub (GMCH)) 102 and an Input/Output (I/O) Controller Hub (ICH) 104. The MCH 102 includes a memory controller 106 that controls communication between the pro cessor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

The processor 101 also includes an AES function 103 to perform AES encryption and decryption operations. The AES function 103 may be used to encrypt or decrypt information stored in memory 108 and/or stored in the storage device 112 using round keys in the key schedule generated using the AES key schedule generator assist 105.

Figure 2:
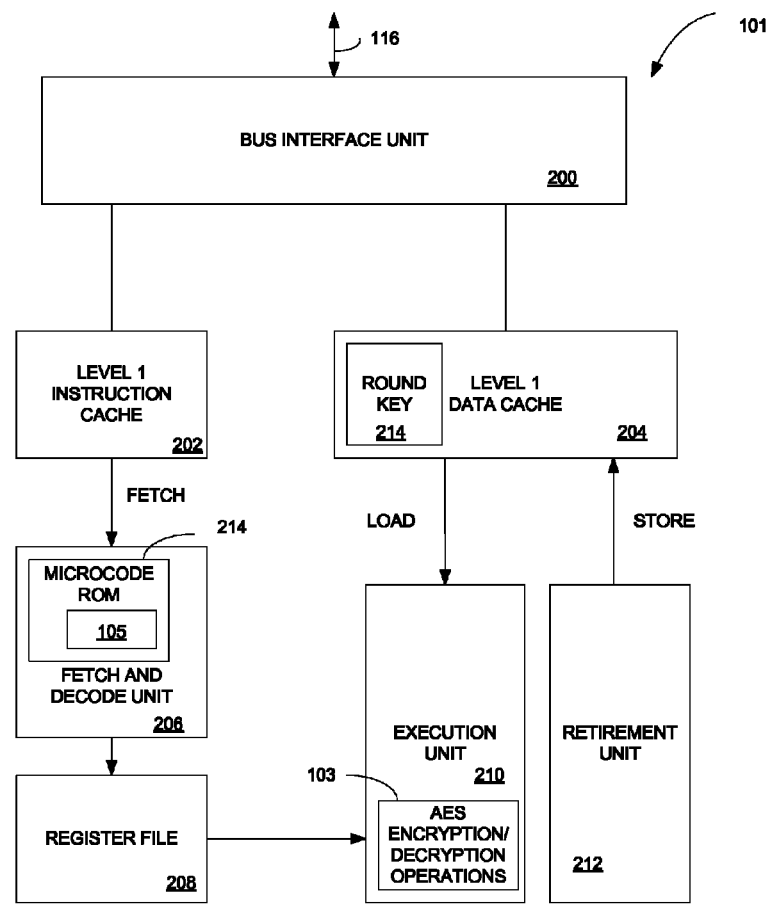
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from Level 1 (L1) instruction cache 202. Data to be used for executing the processor instructions instruction may be stored in register file 208. In one embodiment, the register file 208 includes a plurality of 128-bit registers, which may be used to store data for use by the AES function 103 and by the AES key schedule generator assist 105.

In one embodiment, the register file 208 is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks with one 128-bit block loaded at one time.

In an embodiment, the microcode ROM 214 stores micro operations for the key schedule generator assist 105 used to generate an AES key schedule that may be used to perform AES encrypt and decrypt operations.

The fetch and decode unit 206 fetches macroinstructions from L1 instruction cache 202, decodes the macroinstructions and breaks them into simple operations called micro operations (.mu.ops) that may be stored in microcode Read Only Memory (ROM) 214. The execution unit 210 schedules and executes the micro operations. In the embodiment shown, the AES function 103 in the execution unit 210 and the key schedule generator assist 105 include micro operations for an AES instruction set. The retirement unit 212 writes the results of the executed instructions to registers or memory. A round key 214 generated using the AES key schedule generator assist 105 that may be used to perform AES encrypt and decrypt operations may be stored in L1 data cache 204. The round key 214 may be loaded into the execution unit 210 for use by the micro operations to execute an AES encrypt or decrypt instruction in the AES instruction set. Storing the round key 214 in the data cache 204 protects the round key from (cache access based) side channel attacks, for example, attempts to obtain the round key in order to get access to encrypted information stored in the system 100.

Figure 3:
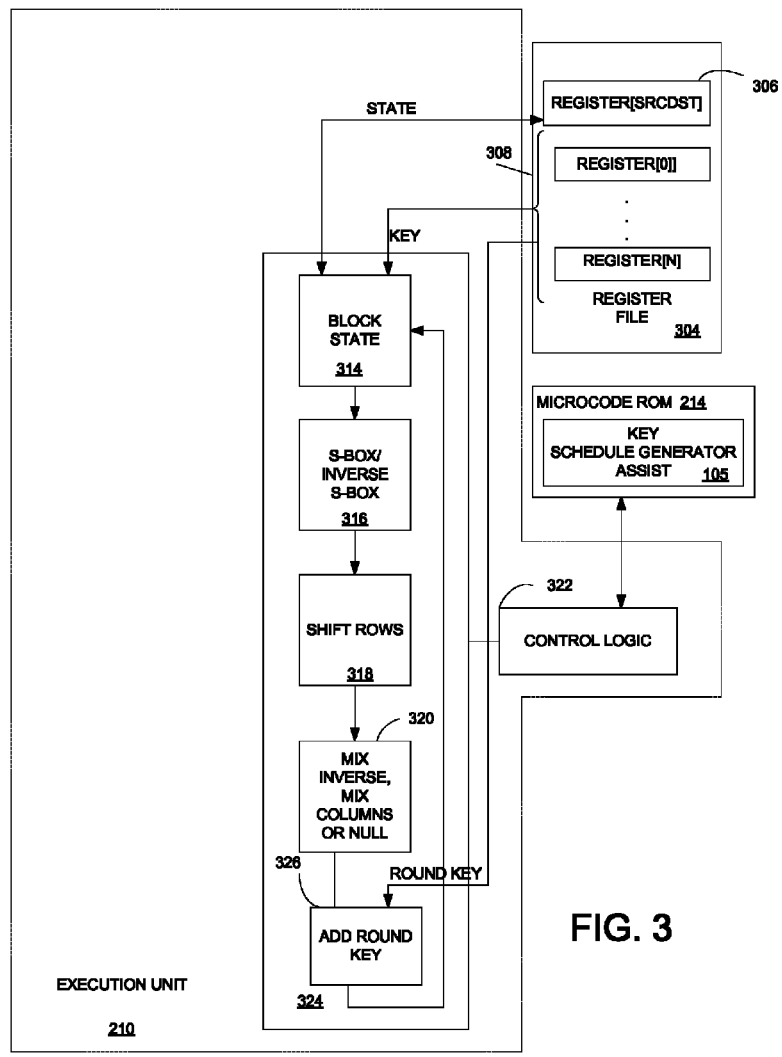
FIG. 3 is a block diagram that illustrates an embodiment of the execution unit shown in FIG. 2 for performing AES encryption or decryption operations.

FIG. 3 is a block diagram that illustrates an embodiment of the execution unit 210 shown in FIG. 2 for performing AES encryption or decryption operations. FIG. 3 will be described in conjunction with FIG. 2.

After an AES instruction in the AES instruction set has been decoded by the fetch and decode unit 206, the execution of an AES instruction by the execution unit 210 involves performing the micro operations associated with the AES instruction that may be stored in the microcode ROM 214.

A flexible AES Key generation assist (AESKEYGENASSIST) instruction according to an embodiment of the present invention may be used by a programmer to assist generation of the AES key schedule used for encryption and decryption operations. Some applications may continuously use the same key. In applications in which performance is very important, a tradeoff can be made in terms of pre-computing a key schedule for the key (that is, a round key per round) once and storing it in memory. Other applications may want to minimize the amount of memory used to store the key schedule while still achieving good performance on multi-block operations. For such applications the key schedule may be pre-computed for multiple blocks before being processed. The memory footprint may be further minimized by only storing the cipher key or the inverse cipher key, and then deriving the other as necessary at the expense of some performance.

In an embodiment, an AES instruction set includes instructions for encryption including AES round encrypt instructions (encrypt (AESENC), encrypt last round (AESENCLAST)) and an AES key generation assist (AESKEYGENASSIST) instruction to assist generation of a key schedule to be used for an encrypt operation.

In an embodiment, the AES instruction set also includes instructions for decryption. The decryption instructions includes a decrypt round (AESDEC) and decrypt last round (AESDECLAST) instruction that assume that decryption is performed using the "Equivalent Inverse Cipher" algorithm. To use the "Equivalent Inverse Cipher", the round keys for decryption are prepared accordingly. More specifically, 10/12/14 Round keys for the encryption (128-bit, 192-bit or 256-bit) need to pass (each one separately) through the Inverse Mix Columns transformation. This can be performed using an AESIMC instruction that receives a 128-bit Round Key, filters the round key through the AES Inverse Mix Columns transformation (the output is in the xmm2 register) and outputs the result of the Inverse Mix Columns transformation.

The register file 304 has a plurality of 128-bit registers which may be used by the AES instructions in the AES instruction set. The 128-bit registers may store source operand(s), round keys and the result of any of the AES instructions in the AES instruction set. The AES instructions use the registers in the register file 304 and may also take input directly from memory as discussed earlier.

When the same key is used for encrypting/decrypting many blocks, the round key for each round (key schedule) may be pre-computed and stored in memory (for example, level 1 data cache 204) so that the same key schedule does not have to be recomputed prior to each encryption/decryption operation on each block.

The size of the key may be 128-bits, 192-bits or 256-bits. The number of rounds to be performed (n) may be 1, 10, 12 or 14 dependent on the size of the key with each round key being a fixed size (128-bits). With a number of rounds value of 10, 12, 14, the AES micro operations may perform standard AES encryption and AES decryption for key sizes of 128-bits, 192-bits or 256-bits.

The round key used for each encryption or decryption round may be pre-computed based on the key and may be stored in level 1 data cache 204 prior to being loaded into any one of the registers 308 in the register file 304. The key for each round may also be stored in one or more registers in the register file 304 or may be stored in round key 214 in level 1 data cache 204.

As discussed earlier, AES has a fixed block size of 128 bits and a key size of 128, 192 or 256 bits. AES operates on a 4.times.4 array of bytes (that is, 16 bytes (128-bit fixed block size)), which is referred to as the 'state'. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits).

In the embodiment shown, a key schedule generator assist 105 assists in generating the key schedule (set of round keys or expanded key). The key schedule generator assist 105 may be implemented as microcode operations and may include microcode operations to perform a subset of the sequence of operations for generating round keys for 128-bit, 196-bit and 256-bit keys as defined by FIPS Publication 197, the AES key schedule generation pseudo code is reproduced below in Table 1 below:

TABLE 1

TABLE-US-00001

KeyExpansion(byte key[4*Nk], word w[Nb*(Nr+1)], Nk) begin word temp i = 0 while (i < Nk) w[i] = word(key[4*i], key[4*i+1], key[4*i+2], key[4*i+3]) i = i+1 end while i = Nk while (i < Nb * (Nr+1)] temp = w [i-1] if (i mod Nk = 0) temp = SubWord(RotWord(temp)) xor Rcon[i/Nk] else if (Nk > 6 and i mod Nk = 4) temp = SubWord(temp) end if w[i] = w[i-Nk] xor temp i = i + 1 end while end The cipher key may be considered to be a rectangular array of bytes, having 4 rows and Nk columns, that is used to derive the round keys (expanded key). The number of columns (Nk) and the number of rounds (Nr) is a function of the size of the cipher key. For the AES algorithm defined in FIPS 197, the length of the input block is 128-bits which is represented by Nb=4. The number of bytes in the expanded key is represented by Nb. The values of Nk, Nr and Nb for each cipher key length is shown in Table 2 below:

TABLE 2

TABLE-US-00002

Cipher Cipher Key sz Key Len (Nk) No. of rounds (Nr) Expanded Key 128-bits 4 10 w0:w43 192-bits 6 12 w0:w51 256-bits 8 14 w0:w59

Cipher key length (Nk) is the number of 32-bit words (number of columns) in the cipher key. The n-bytes of the cipher key are expanded into (Nb*(Nr+1)) words of an expanded key with the first four (Nb) words of the expanded key being the cipher key. Each of the Nr rounds requires four (Nb) 32-bit words of key data. The other round keys are derived from these initial four words as defined in FIPS Publication 197. The resulting key schedule is a linear array of 32-bit words, denoted w.sub.i.

For example, a 128-bit (4.times.32-bit words) cipher key is expanded into an expanded key having 11.times.128-bit round keys, with each round key having 4.times.32-bit words. Thus, the expanded key for a 128-bit cipher key has a total of 44 32-bit words which may be labeled w0-w43. The expanded key for a 192-bit cipher key has 52 32-bits words (w0:w51) and the expanded key for a 256-bit cipher key has 60 32-bit words (w0:w59).

The key schedule generator assist 105 performs operations to assist in expanding the n-bytes of a key into b-bytes of an expanded key (key schedule) with the first n-bytes of the expanded key being the original key. For example, for a 128-bit key, the 128-bit key is expanded into a 176-bytes expanded key, that is, 11.times.16-bytes (128-bits), with the first 16-bytes being the original 128-bit key, and thus the number of rounds is 10. The 24 bytes of a 192-bit key are expanded into 208 bytes (13.times.16 bytes) to provide 12 128-bit "round keys" one for each of the 12 rounds and the 32 bytes of a 256-bit key are expanded into 240 bytes (15.times.16 bytes) to provide 14 128-bit "round keys" one for each of the 14 rounds.

An AESKEYGENASSIST instruction used by the key scheduler 302 performs the "temp=SubWord(RotWord (temp)) xor Rcon[i/Nk]" and the "temp=SubWord(temp)" operations in the FIPS 197 key schedule generation that is shown in Table 1:

However, instead of operating on one 32-bit word (dword) at a time as shown in the AES key schedule generation in Table 1, the AESKEYGENASSIST instruction performs the operations on 4 32-bit words at a time (that is, concurrently on all 4 dwords (128 bits)) thereby increasing the speed at which the round keys are generated.

The AESKEYGENASSIST instruction is used to assist generation of a round key for a key schedule and operates independent of the size of the key, that is, the same operations are performed irrespective as to whether the key size is 128-bits, 192-bits or 256-bits.

In an embodiment, the AESKEYGENASSIST instruction is defined as follows:

AESKEYGENASSIST xmm1, xmm2/m128, imm8

The input data is stored in one of the 128-bit registers 308 (xmm2 register) in the register file 304 or in memory (m128) and in an immediate byte (imm8). The result of the AESKEYGENASSIST instruction is stored in a different one of the 128-bit registers 308 (xmm1 register) in the register file 304.

FIGS. 4A-4D illustrate the operations performed on input data by the AESKENGENASSIST instruction to assist in generating a round key for the key schedule (expanded key). The 128-bits in Tmp1 400 has 15 bytes labeled 15:0.

Figure 4A:
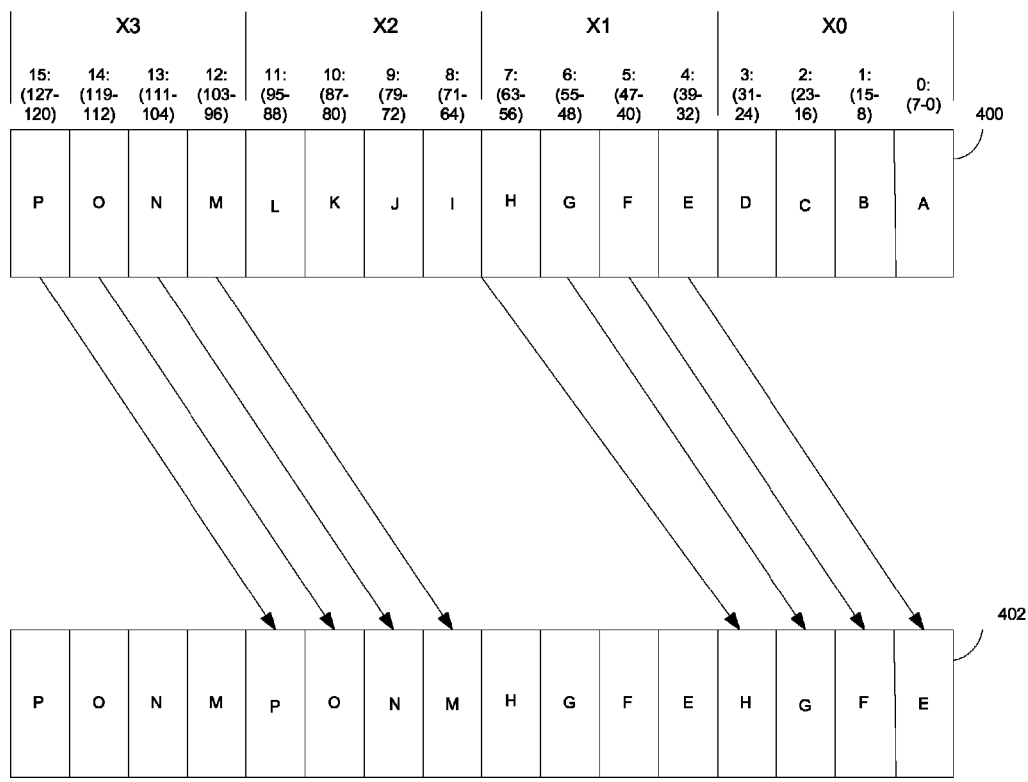
FIGS. 4A-4D illustrate the operations performed on input data by the AESKENGENASSIST instruction to assist in generating a round key for the key schedule (expanded key)

Referring to FIG. 4A, in the embodiment shown, the input data has 128-bits (16 bytes) with the 16 bytes labeled A through P with the Least Significant Byte (LSB) labeled 'A' and the Most Significant Byte (MSB) labeled 'P'. The result also has 128-bits with 16 bytes generated by the operations performed on the 16 bytes of input data.

The 128-bit input data (data operand) is loaded either from the XMM1 register in the register file 304 or from a memory location to a 128-bit temporary register (Tmp1) 400. The data operand stored in the 128-bit temporary register Tmp1 400 includes four 32-bit double words (dwords) labeled X3-X0, with X3 [31-0] corresponding to Tmp1 [127-96]; X2 [31-0] corresponding to Tmp1 [95-64]; X1 [31-0] corresponding to Tmp1 [63-32]; and X0 [31-0] corresponding to Tmp1 [31-0].

Having stored the 128-bit data operand in the Tmp1 register 400, the AESKEYGENASSIST instruction provides the result of the following operations:

TABLE-US-00003 result := [Rot (S-Box4 (X3)) .sym. RCON, S-Box4 (X3), Rot (S-Box4 (X1)) .sym. RCON, S-Box4 (X1)] where: X3 [31-0] := Tmp1 [127-96]; X2 [31-0]:= Tmp1 [95-64]; X1 [31-0]:= Tmp1 [63-32]; and X0 [31-0]:= Tmp1 [31-0]; and RCON [7-0] := imm8[7]imm8[6]imm8[5] imm8[4] imm8[3]imm8[2]imm8[1]imm8[0]

RotWord (Rot) is a function that takes a four-byte 32-bit dword and performs a cyclic permutation. Rotword takes a dword with four bytes labeled a0-a4 in the order {a0, a1, a2, a3} and performs a cycle permutation to return the four bytes in the order {a1, a2, a3, a0}. The RotWord function is defined in a little Endian convention as:

RotWord X[31-0]=[X[7-0].parallel.X [31-8]], [0058] that is, Rot (x)=(X>>8)|(X<<24);

For example, if X[31-0]='3c4fcf09; RotWord ('3c4fcf09')=['09'|'3c4fcf')=('093c4fcf') [0060] S-Box4 denotes the application of a single dword S-Box function to 4 dwords, as follows: [0061] S-Box4 (X) [31-0]=[S-Box (X[31-24]), S-Box (X[23-16]), S-Box (X[15-8]), S-Box (X[7-0])].

An S-box is a non-linear substitution table used to perform a one-for-one substitution of a byte value. A SubWord function takes a four-byte input (32-bit word (dword)) and applies an S-box (byte substitution (SubBytes)) to each of the four bytes in the dword to produce a 32-bit output dword The SubWord function (32 bits) results in 4 independent (parallel) SubByte operations (8-bits).

There are four S-Box4 operations to be performed by the AESKEYGENASSIST instruction, two using dword X3 and two using dword X1. Thus, dwords X3 and X1 stored in Tmp1 are copied to Tmp2 as shown at 402 such that the data stored Tmp2 includes two X3 dwords (with 4 bytes labeled PONM) and two X1 dwords (with 4 bytes values HGFE).

RCON is a round constant word array having 10 elements with each element in the array having 8 bits. With bits 7-0 loaded with the data stored in the immediate byte, that is, RCON [7-0]:=imm8[7]imm8[6]imm8[5 imm8[4 imm8[3 imm8[2 imm8[1 imm8[0]

Each of the elements in the RCON array stores a 8-bit constant value. The 10 AES round constants in hexadecimal notation are as shown in Table 3 below:

TABLE 3

TABLE-US-00004

RCON [1] = 0x01; RCON [2] = 0x02; RCON [3] = 0x04; RCON [4] = 0x08: RCON [5] = 0x10; RCON [6] = 0x20: RCON [7] = 0x40: RCON [8] = 0x80: RCON [9] = 0x1B; RCON [10] = 0x36;

One of the constant values in the RCON array is selected to generate each of the elements in the key schedule for a 128-bit, 192-bit or 256-bit key. The map shown in Table 3 is used to generate the key schedule for a 192-bit key, with the number corresponding to the round indicating the index in the RCON array in which the constant value to be used is stored.

keygen.sub.—192_round_map[13]={0, 1, 1, 2, 3, 3, 4, 5, 5, 6, 7, 7, 8}

Thus, there are 13 RCON constants that are selected from the 10 RCON values stored in the RCON array to generate the key schedule for a 192-bit key.

Figure 4B:
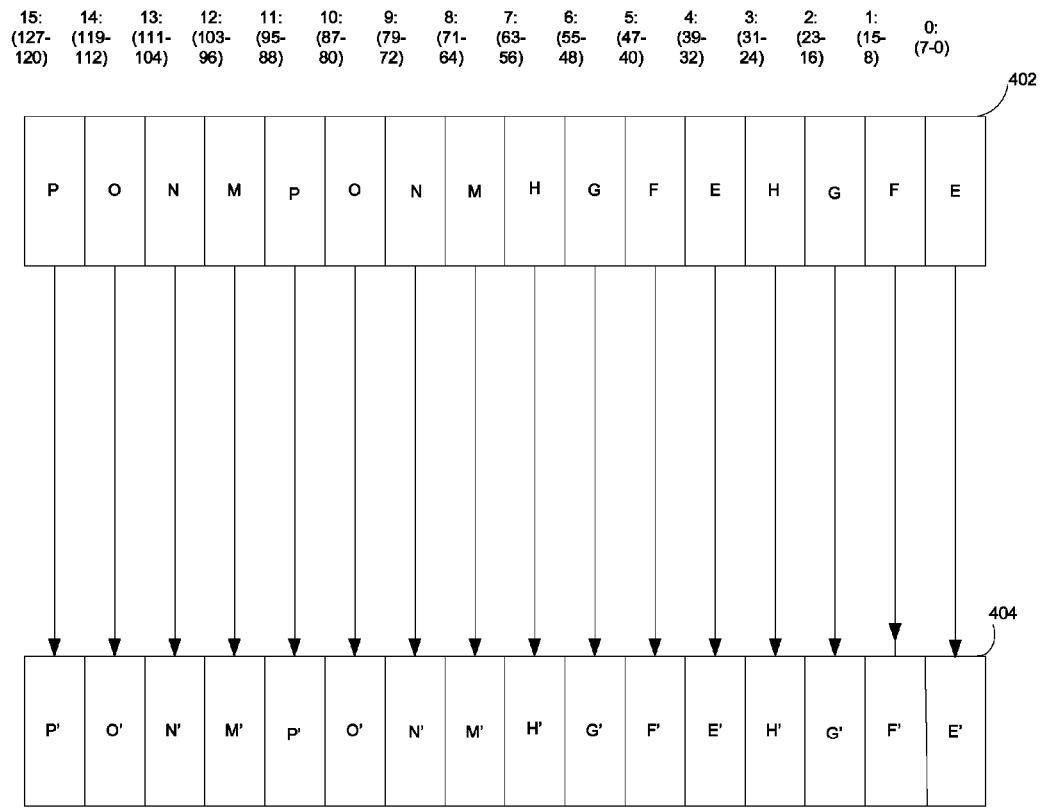

Referring to FIG. 4B, having copied X1 and X2 to tmp2 402, an S-BOX4 operation can be performed on the data stored in tmp2 402 by performing an S-Box function on each of the four dwords in parallel as follows: [0071] S-Box4 (X) [31-0]=[S-Box (X[31-24]), S-Box (X[23-16]), S-Box (X[15-8]), S-Box (X[7-0])].

The result of the S_Box4 function is stored in the tmp2 register as shown at 404. As shown, an S_Box function has been performed on each of the four dwords. For example, the result of the S-Box4 function on bytes labeled PONM in dword X3 is bytes P'O'N'M'.

Figure 4C:
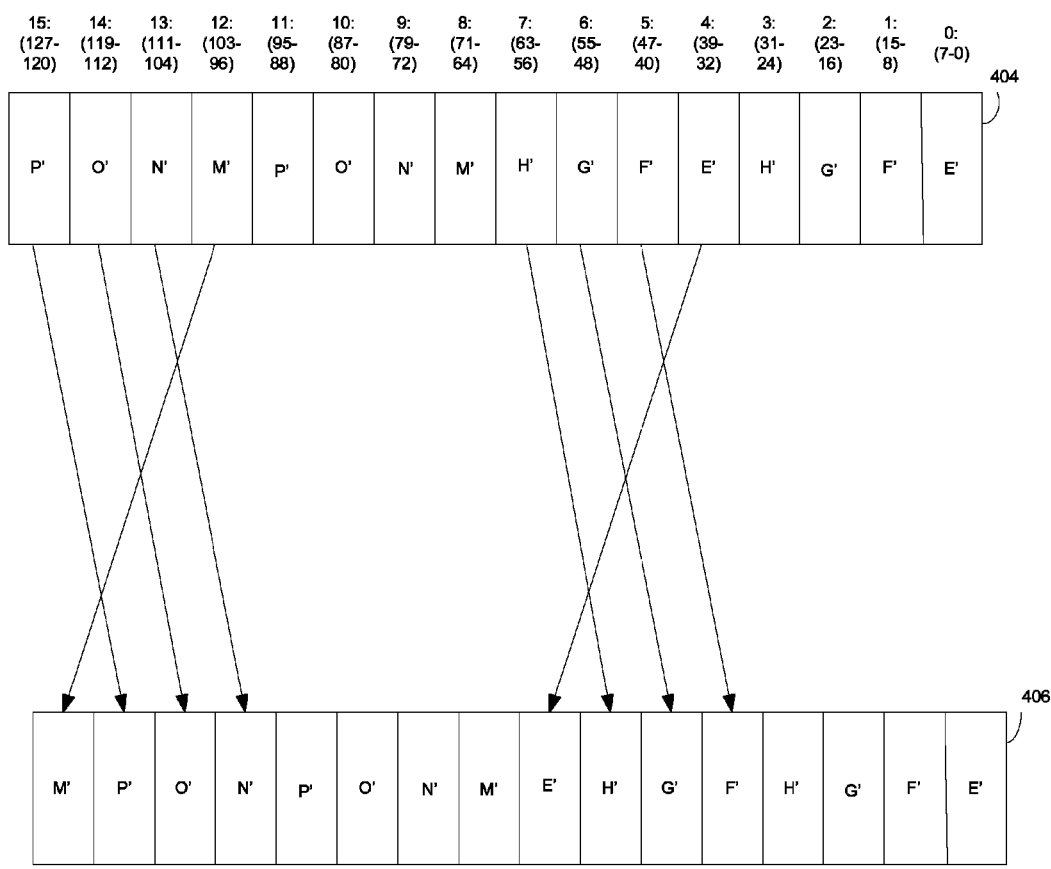

Referring to FIG. 4C, next, a RotWord (Rot) function is performed on the S-Box result of two of the dwords shown at 404, that is, one of the X3 dwords and one of the X1 dwords. The result of each of the RotWord functions is Exclusive ORed (XORed) with the round constant received in the immediate byte.

The state of the Tmp2 register after the Rotword functions have been performed is shown at 406. As shown, the bytes in the respective dword (X3 or X1) have been rotated to provide M'P'O'N' and E'H'G'F'.

Figure 4D:
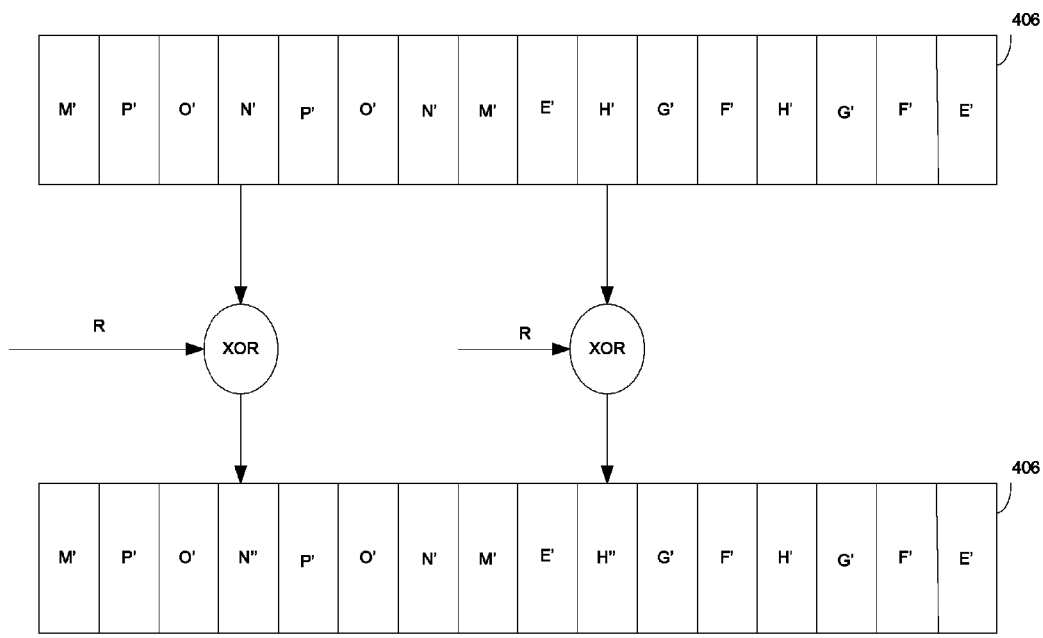

Referring to FIG. 4D, after the Rotword function has been performed, the result of exclusive OR operation with the round constant (RCON) is shown at 408. As shown, the result of the single byte round constant exclusive ORed with M'P'O'N' This is M'P'O'N" and the result of the single byte round constant exclusive ORed with E'H'G'F' is and E'H'G'F". This is also the final result for the AESGENASSIST instruction that is stored in the XMM1 register (destination operand) in the register file 304.

The AESKEYGENASSIST instruction also protects the round key from (cache access based) side channel attacks, for example, attempts to obtain the round key in order to get access to encrypted information stored in the system 100.

In another embodiment, the key schedule generation assist instruction may be implemented as a hardware state machine sequence in the execution unit 210. In yet another embodiment, some portion of the key schedule generation assist instruction may be implemented as microcode operations stored in the microcode ROM 214 and the remainder of the key scheduler, for example, an S-Box may be implemented as a hardware state machine sequence in the execution unit 210.

The AESKEYGENASSIST instruction may be used to assist in generating the "next round key" for the key schedule, given the previous round key. The AESKEYGENASSIST instruction is simple and intuitive for a programmer to use, for generating the AES key schedule. The use of the instruction is intuitive, for all 3 possible AES key lengths (128-bits, 192-bits and 256-bits). Furthermore, the instruction is agnostic to the AES key length. The immediate byte passed to the instruction is the AES round constant (RCON). The instruction is only a few micro operations which uses a small portion of the microcode Read Only Memory (ROM) 214 and thus only requires a small validation effort. In addition, the round keys are generated in the SSE domain where the other AES instructions in the AES instruction set operate, therefore increasing the speed at which the key schedule generation may be performed. Furthermore, the AESKEYGENASSIST instruction accommodates a little Endian architecture.

Figure 5:
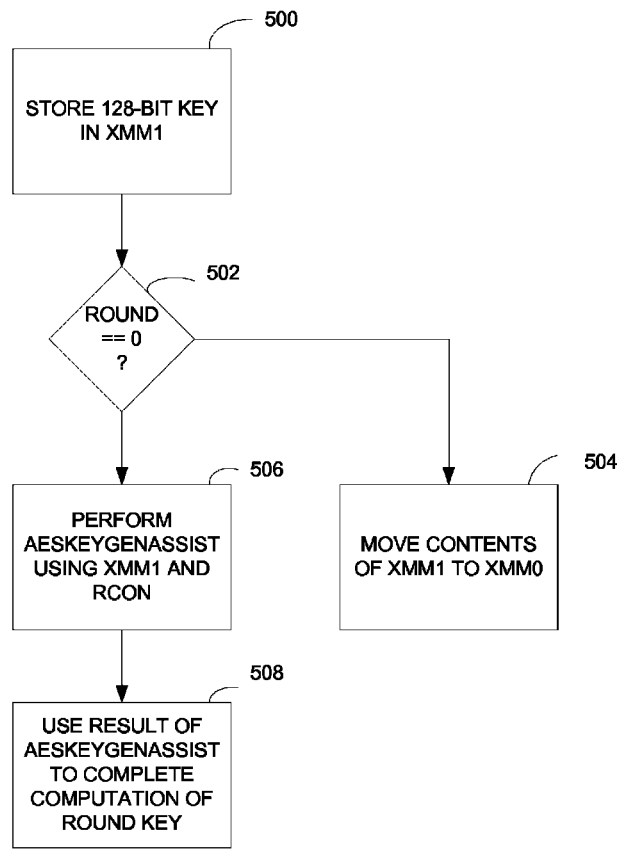
FIG. 5 is a flowgraph of an embodiment of a method for using the AESKEYGENASSIST instruction to assist in generating a round key for a key schedule for a 128-bit cipher key.

FIG. 5 is a flowgraph of an embodiment of a method for using the AESKEYGENASSIST instruction to assist in generating a round key for a key schedule for a 128-bit cipher key.

At block 500, the 128-bit cipher key is stored in the XMM1 register in the register file 304. Processing continues with block 502.

At block 502, the first 128-bit round key in the expanded key is the 128-bit cipher key. If the round key is being generated for the first round of the key schedule, the contents of the XMM1 register are moved to the XMM0 register and returned as the round key. The AESKEYGENASSIST instruction is not required, processing is complete. If this is not the first round, processing continues with block 504.

At block 504, the AESKEYGENASSIST instruction is called to perform some of the operations to generate the round key for the current round as discussed earlier in conjunction with FIGS. 4A-4D. The 128-bit key stored in the XMM1 register is passed to the AESKEYGENASSIST instruction in addition to the constant stored in the RCON array for the current round. The output (destination operand) computed by the AESKEYGENASSIST instruction is stored in another XMM register in the register file 304. Processing continues with block 506.

At block 506, further processing is performed on the result returned from the AESKEYGENASSIST instruction to perform the remaining operations defined by the FIPS-197 standard that are not performed by the AESKEYGENASSIST instruction as shown in Table 1. In one embodiment, a sequence of IA-32 instructions may be executed to perform these operations on the result to generate the round key. The IA-32 instructions include instructions to shuffle dwords by inserting them at specified locations in the XMM registers (PSHUFD or SHUFFPS), instructions to perform bit-wise XOR operations (XORPS) and instructions to move contents of one register to another register (MOVDQA/MOVDQU) and to insert values at a bit position in a register (INSERTPS or PINSRD).

An example of a loose C code snippet that includes IA-32 instructions (shuffle, move, insert, XOR) and macros (macro_do_full_xor) that may used to compute the round key using the result of the AESKEYGENASSIST function for a 128-bit key are shown below in Table 4. The macro "macro_do_full_xor" performs a full XOR tree construction and calculation. The notation 'inst_' is used to indicate a processor instruction and the notation 'macro_' is used to indicate a macro.

TABLE 4

Figure 6:
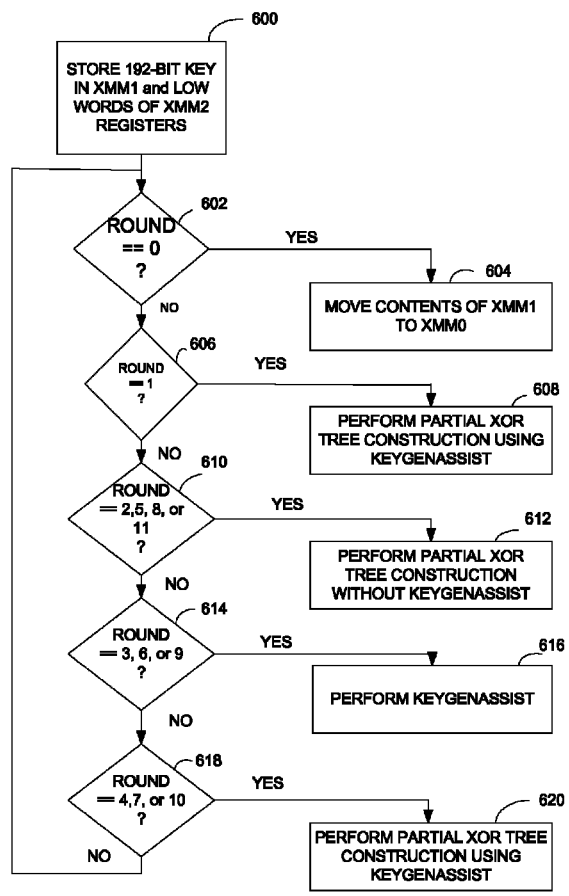
FIG. 6 is a flowgraph of an embodiment of a method for using the AESKEYGENASSIST instruction to assist in generating a round key for a key schedule for a 192-bit cipher key.

TABLE-US-00005 inst_aes_keygen_assist(xmm3, xmm1, RCON [round)]; inst_pfp_shuffle (xmm3, xmm3, 0xff); macro_do_full_xor(xmm0, xmm1); inst_pfp_xor (xmm0, xmm3); void macro_do_full_xor (unsigned char *xmm3, unsigned char *xmm1) { unsigned char xmm6[16]; // copy word 0 everywhere inst_pfp_shuffle(xmm3, xmm1, 0x00); // copy word 1 to 3 most significant words inst_pfp_shuffle(xmm6, xmm1, 0x55); inst_pfp_insert(xmm6, const_0, 0x0); inst_pfp_xor(xmm3, xmm6); // copy word 2 to 2 most significant words inst_pfp_shuffle(xmm6, xmm1, 0xaa); inst_pfp_insert (xmm6, const_0, 0x0); inst_pfp_insert(xmm6, const_0, 0x1); inst_pfp_xor(xmm3, xmm6); // copy word 3 to 1 most significant words inst_pfp_shuffle(xmm6, xmm1, 0xff); inst_pfp_insert(xmm6, const_0, 0x0); inst_pfp_insert(xmm6, const_0, 0x1); inst_pfp_insert(xmm6, const_0, 0x2); inst_pfp_xor(xmm3, xmm6);

FIG. 6 is a flowgraph of an embodiment of a method for using the AESKEYGENASSIST instruction to assist in generating a round key for a key schedule for a 192-bit cipher key. The key schedule for the 192-bit cipher key has 13 round keys.

The generation of the key schedule for a 192-bit cipher key is more complicated than the generation of the key schedule for the 128-bit key and the 256-bit key because 192 is not a multiple of 128.

At block 600, as a 192-bit cipher key has 6 32-bit words (Nk), the 192-bit cipher key is stored in both the XMM1 register (4 32-bit words (dwords)-128-bits) and the XMM2 (low 2 words (64-bits) of the six words) in the register file. Processing continues with block 602.

At block 602, the first 128-bit round key in the expanded key is 4 words of the 192-bit cipher key stored in the XMM1 register. If the round key is being generated for the first round of the key schedule, processing continues with block 604. If the round is not zero, processing continues with block 606.

At block 604, as the round key for the first round is the 128-bits stored in the XMM1 register in the register file, the contents of the XMM1 register are moved to the XMM0 register and returned as the round key for round 0. Processing is complete.

At block 606, if the round number is 1, processing continues with block 608. If not, processing continues with block 610.

At block 608, the 2 dwords stored in the XMM2 register are used to generate the round key for round 1. Round key 1 is computed by performing a partial XOR tree construction and using the result of the AESKEYGENASSIST instruction. An example of macros and instructions are shown below in Table 5.

TABLE 5

TABLE-US-00006 macro_do_partial_xor_keygen(xmm0, xmm1, RCON [keygen_192_round_map[round]]) inst_pfp_insert(xmm0, xmm1, 0); inst_pfp_insert(xmm0, xmm1, 1); void macro_do_partial_xor_keygen (unsigned char *xmm3, unsigned char *xmm1_low_words, int round_const) { unsigned char xmm5[16]; // first move words in 2 and 3 to 0 and 1 inst_pfp_shuffle(xmm5, xmm1_low_words, 0xe); // do partial xor macro_do_partial_xor(xmm3, xmm5); // move the words 0 and 1 of xmm1 to 2 and 3 inst_pfp_shuffle(xmm5, xmm3, 0x40); inst_aes_keygen_assist (xmm3, xmm1_low_words, round_conts); // copy the word 1 to words 2 and 3 inst_pfp_shuffle(xmm3, xmm3, 0x50); inst_pfp_xor(xmm3, xmm5); }

At block 610, if the round number is 2, 5, 8 or 11, processing continues with block 612. If not, processing continues with block 614.

At block 612, a partial XOR tree construction is performed without calling the AESKEYGENASSIST instruction.

At block 614, if the round number is 3, 6, or 9, processing continues with block 616. If not, processing continues with block 618.

At block 616, the AESKEYGENASSIST instruction is performed.

At block 618, if the round number is 4, 7 or 10, processing continues with block 620. If not, processing continues with block 600.

At block 620, a partial XOR tree construction is performed using the AESKEYGENASSIST instruction.

Figure 7:
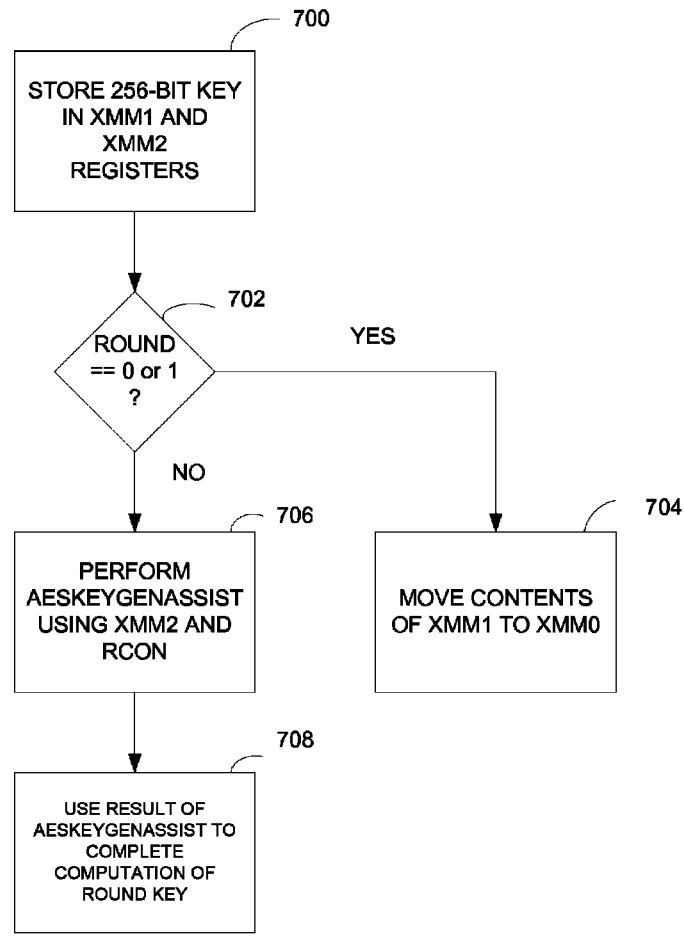
FIG. 7 is a flowgraph of an embodiment of a method for using the AESKEYGENASSIST instruction to assist in generating a round key for a key schedule for a 256-bit cipher key.

FIG. 7 is a flowgraph of an embodiment of a method for using the AESKEYGENASSIST instruction to assist in generating a round key for a key schedule for a 256-bit cipher key.

At block 700, the 256-bit key is stored in the XMM0 and the XMM1 register in the register file 304. Processing continues with block 702.

At block 702, if the round key is being generated for the first round or the second round of the key schedule, processing continues with block 704. If not, processing continues with block 706.

At block 704, the contents of the XMM1 register are moved to the XMM0 register and returned as the round key. Processing is complete.

At block 7046 the AESKEYGENASSIST instruction is called to perform some of the operations to generate the round key for the current round as discussed earlier in conjunction with FIG. 4. The 128-bit portion of the 256-bit key stored in the XMM2 register is passed to the AESKEYGENASSIST instruction in addition to the constant stored in the RCON array for the current round. The output computed by the AESKEYGENASSIST instruction is stored in another XMM register in the register file 304. Processing continues with block 708.

At block 708, further processing is performed on the result returned from the AESKEYGENASSIST instruction to perform the remaining operations required to generate the key schedule as defined by FIPS-197 and shown in Table 1. An example of instructions (shuffle, move, insert, XOR) that may used to compute the round key using the result of the AES-KEYGENASSIST function for a 128-bit key are shown below in Table 6.

TABLE 6

TABLE-US-00007

```
// for odd rounds else if (round & 0x1) { inst_aes_keygen_assist(xmm3,
xmm2, RCON [round/2]); inst_pfp_shuffle(xmm3, xmm3, 0xaa);
macro_do_full_xor(xmm0, xmm1); inst_pfp_xor(xmm0, xmm3); }
// for even rounds else { inst_aes_keygen_assist(xmm3, xmm2, RCON
[round/2]); inst_pfp_shuffle(xmm3, xmm3, 0xff); macro_do_full_xor
(xmm0, xmm1); inst_pfp_xor(xmm0, xmm3); }
```

As shown in Table 6, a different constant (0xaa or 0xff) is provided to the shuffle instruction based on whether the round for which the round key is being computed is even or odd.

Returning to FIG. 3, after the round key has been computed using the AESKEYGENASSIST instruction, encryption and decryption operations may be performed using the computed round key.

Prior to performing the per round encryption or decryption operation, the execution unit 210 retrieves the state and the key which are stored in the register file 304. Each encryption/decryption round operation is performed using the micro operations for the AES instruction stored in the Read Only Memory (ROM) 214. In the embodiment shown, the state (128-bit block state) is stored in register 306 and the key is stored in one or more of the other registers 308 in the register file 304. After the execution of the AES instruction is complete, the resulting state is stored in register 306 in the register file 304. The state may be an intermediate round date to be used by a next AES round or the final result of the AES encryption or decryption operation.

Upon decoding the operation code (opcode) in an AES instruction, a number of parameters to be used to control the flow in the AES instruction for one AES round are stored in control logic 322. The parameters include the type of operation (encryption or decryption) and whether it is a last round.

AES round logic 324 may include micro operations for the following stages: block state 314, s-box/inverse S-box 316, shift rows 316 and mix inverse, mix columns or null (referred to as "mix columns") 320 and add round key 326.

In block state 314, the 128-bit input (state) to the AES round logic 324 is added with a key (128-bit portion of the expanded key associated with the round) using bitwise XOR to produce a 128-bit intermediate value (state).

In the S-box/inverse S-box 316, each byte of this 128-bit intermediate value is substituted with another byte value that may be stored and retrieved from a lookup table also referred to as a substitution box or "S-Box". The S-box takes some number of input bits, m, and transforms them into some number of output bits, n and is typically implemented as a lookup table. A fixed lookup table is typically used. This operation provides non-linearity through the use of the inverse function over Galois Field (GF)(2.sup.8). For example, the n-bit output may be found by selecting a row in the lookup table using the outer two bits of the m-bit input, and selecting a column using the inner bits of the m-bit input.

In Shift Rows 318, the results from S-box/inverse S-box 316 passes through a bit-linear transform in which bytes in each row of the 4.times.4 array (128-bit (16 bytes) state) received from the Sub Bytes stage are shifted cyclically to the left. The number of places each byte is shifted differs for each row in the 4.times.4 array.

In Mix Columns 320, the results from Shift Rows 320 passes through a bit-linear transform in which each column of the 4.times.4 array (state) is treated as a polynomial over a binary Galois Field (GF)(2.sup.8) and is then multiplied modulo x.sup.4+1 with a fixed polynomial c(x)=3x.sup.3+x.sup.2+x+2. A last AES round differs from the other AES rounds in that it omits Mix Columns 320.

Add Round Key 324 after the Mix Columns stage 320 performs an exclusive OR function on the round key from the expanded key and the result of Shift Rows 318 or Mix Columns 320 for the AES round.

The set of AES instructions that include single AES round instructions and AES round key generation assist instructions allows variants of AES with different number of rounds and key schedules, that is, variants of AES not defined by FIPS Publication 197. Thus, the single round AES instructions in the AES instruction set provide flexibility in performing AES encryption and decryption.

As the number of rounds performed by the AES instruction set is not fixed, any numbers of rounds, if required, may be performed. For example, the number of rounds may be varied to support future encryption/decryption standards if new standards for hashing or MAC-ing attacks, or attacks on AES are introduced.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a hardware decoder to decode a user-level key generation assist instruction; and
a hardware execution unit, responsive to the user-level key generation assist instruction, to modify a data operand including to:
overwrite a second portion and a fourth portion in the data operand by copying a first portion to the second portion and copying a third portion to the fourth portion;
concurrently perform a byte substitution on all bytes of each of the plurality of portions in the data operand;
concurrently perform a rotate word on the first portion and the fourth portion; and
concurrently perform an exclusive OR operation on the first portion and an immediate data and an exclusive OR operation on the fourth portion and the immediate data.

2. The processor of claim 1, wherein the hardware execution unit to copy the modified data operand to a destination operand.

3. The processor of claim 1, wherein the data operand is to store a 128-bit cipher key in four portions with each portion having 32-bits.

4. The processor of claim 1, wherein the data operand is to store 128-bits of a 256-bit cipher key.

5. The processor of claim 1, wherein the data operand is to store 128-bits of a 192-bit cipher key.

6. The processor of claim 1, wherein the immediate data is to store a round constant.

7. The processor of claim 1, wherein the data operand is to be stored in an XMM register.

8. The processor of claim 2, wherein the destination operand is to be stored in an XMM register.

9. The processor of claim 1, wherein the data operand is an Advanced Encryption Standard (AES) round key.

10. A non-transitory machine-readable medium having stored thereon instructions, which if performed by a machine cause the machine to perform a method comprising:
modifying a data operand having a plurality of portions by:
overwriting a second portion and a fourth portion in the data operand by copying a first portion to the second portion and copying a third portion to the fourth portion;
concurrently performing a byte substitution on all bytes of each of the plurality of portions in the data operand;
concurrently performing a rotate word on the first portion and a rotate word on the fourth portion; and
concurrently performing an exclusive OR operation on the first portion and an immediate data and an exclusive OR operation on the fourth portion and the immediate data.

11. The non-transitory machine-readable medium of claim 10, wherein the method further comprises:
copying the modified data operand to a destination operand.

12. The non-transitory machine-readable medium of claim 10, wherein the data operand stores a 128-bit cipher key in four portions with each portion having 32-bits.

13. The non-transitory machine-readable medium of claim 10, wherein the data operand stores 128-bits of a 256-bit cipher key.

14. The non-transitory machine-readable medium of claim 10, wherein the data operand stores 128-bits of a 192-bit cipher key.

15. The non-transitory machine-readable medium of claim 10, wherein the immediate data stores a round constant.

16. The non-transitory machine-readable medium of claim 10, wherein the data operand is stored in an XMM register.

17. The non-transitory machine-readable medium of claim 11, wherein the destination operand is stored in an XMM register.

18. The non-transitory machine-readable medium of claim 10, wherein the data operand is an Advanced Encryption Standard (AES) round key.

19. A system comprising:
a processor including an execution unit and a microcode storage to store a plurality of instructions to perform a subset of a sequence of operations to generate a round key, wherein the sequence subset includes:
overwrite of a second portion and a fourth portion of a data operand by copying a first portion to the second portion and copying a third portion to the fourth portion;
concurrent byte substitution on all bytes of each of the plurality of portions in the data operand;
concurrent rotate word operation on the first portion and on the fourth portion; and
concurrent exclusive OR operation on the first portion and an immediate data and exclusive OR operation on the fourth portion and the immediate data; and
a dynamic random access memory (DRAM) coupled to the processor.

20. The system of claim 19, wherein the processor is to copy the modified data operand to a destination operand.

* * * * *